United States Patent
Myers (10) Patent No.: US 10,601,079 B2
(45) Date of Patent: Mar. 24, 2020

(54) BATTERY ASSEMBLY INCLUDING CELL STRIP ARRAY AND METHOD

(71) Applicant: Ford Global Technologies, LLC, Dearborn, MI (US)

(72) Inventor: Eric Myers, Howell, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 102 days.

(21) Appl. No.: 16/000,131

(22) Filed: Jun. 5, 2018

(65) Prior Publication Data
US 2019/0372169 A1    Dec. 5, 2019

(51) Int. Cl.
| | |
|---|---|
| *H01M 10/0587* | (2010.01) |
| *H01M 10/02* | (2006.01) |
| *H01M 10/625* | (2014.01) |
| *H01M 10/6554* | (2014.01) |
| *H01M 10/613* | (2014.01) |

(52) U.S. Cl.
CPC ....... *H01M 10/0587* (2013.01); *H01M 10/02* (2013.01); *H01M 10/613* (2015.04); *H01M 10/625* (2015.04); *H01M 10/6554* (2015.04); *H01M 2220/20* (2013.01)

(58) Field of Classification Search
CPC ........... H01M 10/0525; H01M 10/052; H01M 10/0562; H01M 4/04; H01M 4/64; H01M 10/0585; H01M 2/0207
See application file for complete search history.

(56) References Cited

U.S. PATENT DOCUMENTS

| | | | |
|---|---|---|---|
| 3,353,999 A | 11/1967 | Osborn | |
| 4,687,717 A | 8/1987 | Kaun et al. | |
| 5,633,097 A * | 5/1997 | Miller | H01M 6/40 29/623.3 |
| 5,849,431 A | 12/1998 | Kita et al. | |
| 6,287,719 B1 | 9/2001 | Bailey | |
| 7,622,212 B2 | 11/2009 | Forte | |
| 9,331,358 B2 | 5/2016 | Bhardwaj et al. | |
| 9,622,294 B1 | 4/2017 | Ostanek | |
| 9,640,833 B2 | 5/2017 | Ebert et al. | |
| 2005/0233210 A1* | 10/2005 | Horie | H01M 2/34 429/161 |
| 2015/0072204 A1 | 3/2015 | Kwon et al. | |
| 2015/0200384 A1 | 7/2015 | Gonzales et al. | |

* cited by examiner

*Primary Examiner* — Stewart A Fraser
(74) *Attorney, Agent, or Firm* — David B. Kelley; Carlson, Gaskey & Olds, P.C.

(57) ABSTRACT

This disclosure relates to a battery assembly, such as a battery assembly for an electrified vehicle, and a corresponding method. An example battery assembly includes a layer of electrolyte, a plurality of first electrodes arranged on a first side of the layer of electrolyte, a plurality of second electrodes arranged on a second side of the layer of electrolyte, and a plurality of battery cells. Further, each of the battery cells includes a portion of the layer of electrolyte, one of the first electrodes, and one of the second electrodes.

19 Claims, 8 Drawing Sheets

BATTERY ASSEMBLY INCLUDING CELL STRIP ARRAY AND METHOD

TECHNICAL FIELD

This disclosure relates to a battery assembly, such as a battery assembly for an electrified vehicle, and a corresponding method. In particular, this disclosure relates to a battery assembly including a cell strip array.

BACKGROUND

The need to reduce automotive fuel consumption and emissions is well known. Therefore, vehicles are being developed that reduce reliance on internal combustion engines. Electrified vehicles are one type of vehicle being developed for this purpose. In general, electrified vehicles differ from conventional motor vehicles in that electrified vehicles are selectively driven using one or more electric machines powered by a first power supply, namely a traction battery (i.e., a battery pack). The electric machines can drive the electrified vehicles instead of, or in addition to, a second power supply, such as an internal combustion engine. Example electrified vehicles include hybrid electric vehicles (HEVs), plug-in hybrid electric vehicles (PHEVs), fuel cell vehicles (FCVs), and battery electric vehicles (BEVs).

High voltage battery assemblies are employed to power the electric machines of electrified vehicles. The battery assemblies typically include cell stacks constructed of a plurality of battery cells. One known type of cell is a cylindrical Lithium-ion battery cell, which is referred to colloquially as a "swiss roll" or a "jelly roll." These cells feature a single, long sandwich of a positive electrode, a separator, and a negative electrode rolled into a single spool.

SUMMARY

A battery assembly according to an exemplary aspect of the present disclosure includes, among other things, a layer of electrolyte provided by a single, continuous layer of material, a plurality of first electrodes arranged on a first side of the layer of electrolyte, a plurality of second electrodes arranged on a second side of the layer of electrolyte, and a plurality of battery cells. Each of the battery cells includes a portion of the layer of electrolyte, one of the first electrodes, and one of the second electrodes.

In a further non-limiting embodiment of the foregoing battery assembly, the layer of electrolyte is provided by a layer of electrically insulative and ionically conductive material.

In a further non-limiting embodiment of any of the foregoing battery assemblies, the first electrodes include a plurality of anodes and a plurality of cathodes, the second electrodes include a plurality of anodes and a plurality of cathodes, and each of the cells includes an anode arranged on one of the first and second sides and a cathode arranged on the other of the first and second sides.

In a further non-limiting embodiment of any of the foregoing battery assemblies, the first and second electrodes are mounted to the layer of electrolyte.

In a further non-limiting embodiment of any of the foregoing battery assemblies, adjacent oppositely-charged pairs of the first electrodes are electrically coupled together by metal foil mounted to the first electrodes, and adjacent oppositely-charged pairs of the second electrodes are electrically coupled together by metal foil mounted to the second electrodes.

In a further non-limiting embodiment of any of the foregoing battery assemblies, the assembly includes a second layer of electrolyte covering the second electrodes and the metal foil mounted to the second electrodes.

In a further non-limiting embodiment of any of the foregoing battery assemblies, the assembly includes a first carrier strip, the first electrodes supported on the first carrier strip, and a second carrier strip, the second electrodes supported on the second carrier strip.

In a further non-limiting embodiment of any of the foregoing battery assemblies, the first and second electrodes have widths substantially equal to widths of the first and second carrier strips and a width of the layer of electrolyte.

In a further non-limiting embodiment of any of the foregoing battery assemblies, adjacent oppositely-charged pairs of the first electrodes are electrically coupled together by metal foil mounted to the first carrier strip, and adjacent oppositely-charged pairs of the second electrodes are electrically coupled together by metal foil mounted to the second carrier strip.

In a further non-limiting embodiment of any of the foregoing battery assemblies, the first and second carrier strips are provided by separate pieces of material.

In a further non-limiting embodiment of any of the foregoing battery assemblies, the first and second carrier strips are provided by a single piece of material that is folded along its length.

In a further non-limiting embodiment of any of the foregoing battery assemblies, the first and second carrier strips are made of a material that is neither electrically nor ionically conductive.

In a further non-limiting embodiment of any of the foregoing battery assemblies, the assembly includes a metal foil layer configured to conduct heat away from the battery cells.

In a further non-limiting embodiment of any of the foregoing battery assemblies, the battery assembly is wrapped around the spool.

In a further non-limiting embodiment of any of the foregoing battery assemblies, the spool is one of circular and triangular in cross-section.

In a further non-limiting embodiment of any of the foregoing battery assemblies, a thermal exchange plate adjacent the spool, the thermal exchange plate coupled to the metal foil layer.

A method according to an exemplary aspect of the present disclosure includes, among other things, arranging a plurality of first electrodes on a first side of a layer of electrolyte, arranging a plurality of second electrodes on a second side of the layer of electrolyte, and sandwiching the layer of electrolyte between the first and second electrodes to provide a plurality of battery cells along a length of the layer of electrolyte.

In a further non-limiting embodiment of the foregoing method, the method includes rolling the sandwiched arrangement about a spool.

In a further non-limiting embodiment of any of the foregoing methods, the method includes cooling the sandwiched arrangement using a thermal exchange plate.

In a further non-limiting embodiment of any of the foregoing methods, the method includes arranging the battery cells either in series or in parallel.

DETAILED DESCRIPTION

This disclosure relates to a battery assembly, such as a battery assembly for an electrified vehicle, and a corresponding method. An example battery assembly includes a layer of electrolyte, a plurality of first electrodes arranged on a first side of the layer of electrolyte, a plurality of second electrodes arranged on a second side of the layer of electrolyte, and a plurality of battery cells. Further, each of the battery cells includes a portion of the layer of electrolyte, one of the first electrodes, and one of the second electrodes.

This arrangement has a number of benefits, including increasing the ease of manufacturing an array of battery cells, and increasing the ease of packaging the same within a vehicle. Regarding the former point, the arrangement can be manufactured in an easily repeatable process using known techniques. In particular, the layer of electrolyte is easily aligned with the electrodes to form a plurality of battery cells, which increases the ease of manufacture and assembly. Regarding the latter point, the arrangement can be sandwiched together and rolled about a spool which facilitates ease of storage and placement in a battery, and also facilitates thermal management. That is, because the battery cells are packaged closer together, a thermal exchange plate can provide more efficient and uniform cooling. These and other benefits will be appreciated from the below description.

Figure 1:
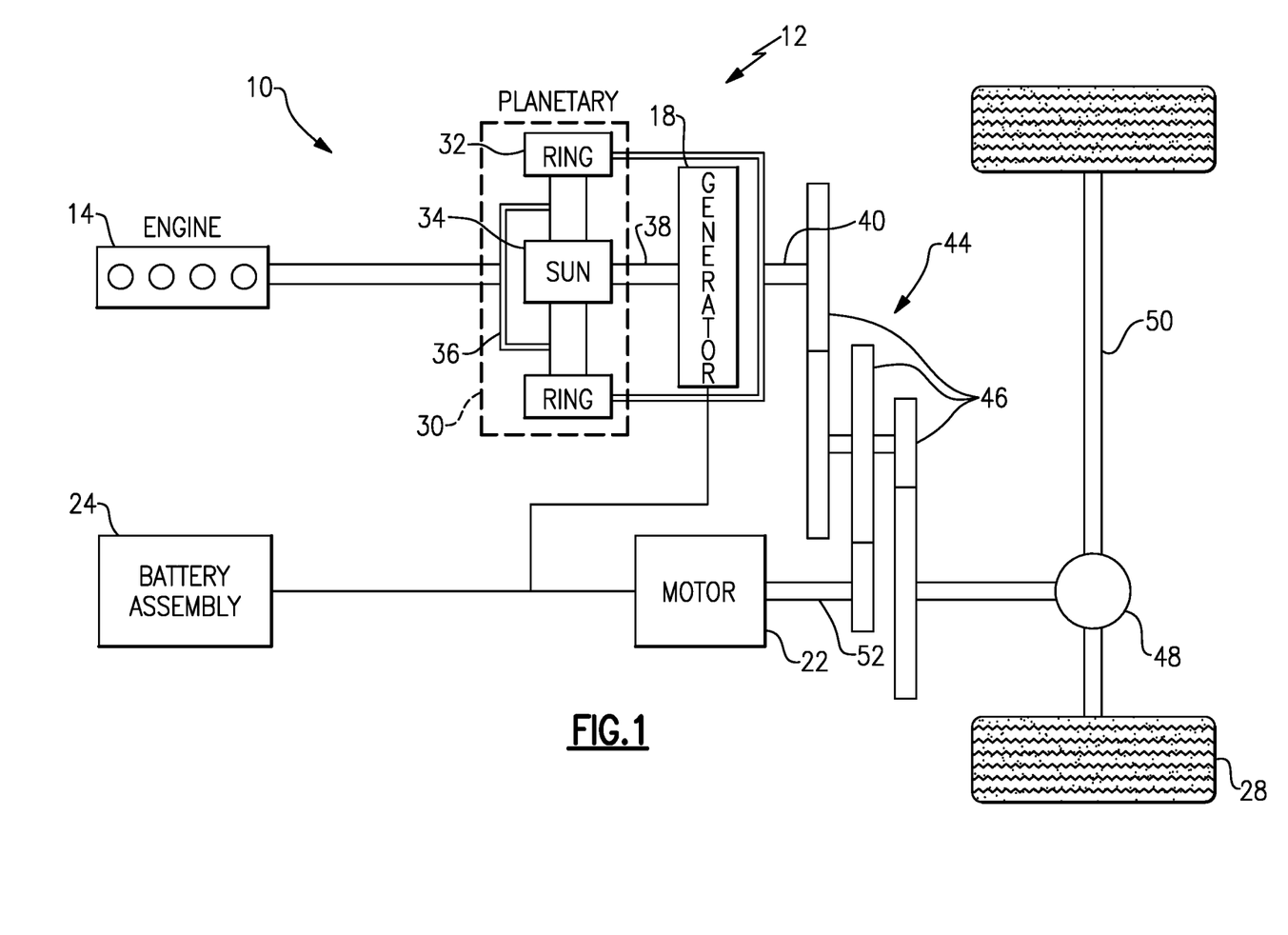
FIG. 1 schematically illustrates an example powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs), battery electric vehicles (BEVs) and fuel cell vehicles.

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary electrified vehicle battery. The battery assembly 24 may include a high voltage traction battery pack that includes a plurality of battery cells capable of outputting electrical power to operate the motor 22 and the generator 18, among other components. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion. The electrified vehicle 12 may be operated in other operating modes in addition to the EV and HEV modes within the scope of this disclosure.

Figure 2A:
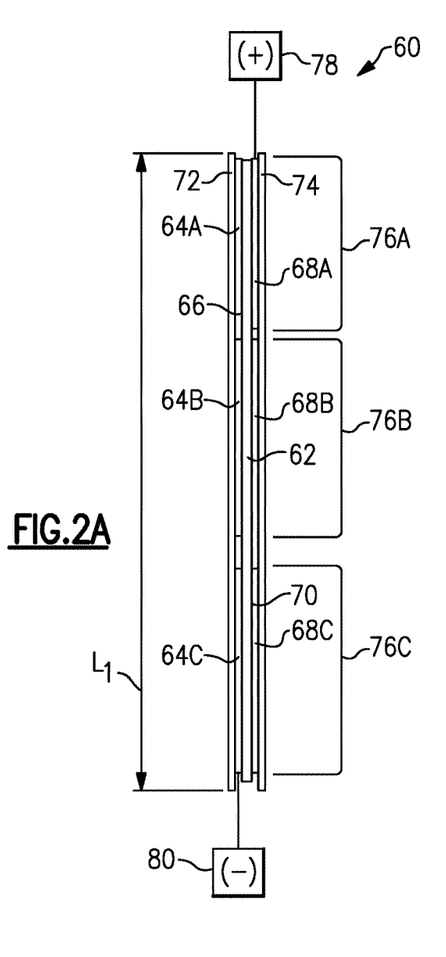
FIG. 2A illustrates a first example cell strip assembly from a side view.

FIG. 2A illustrates a first example cell strip assembly 60, or cell strip array, from a side view. The cell strip assembly 60 provides a plurality of battery cells which are configured to output electrical power to drive the motor 22, for example. The cell strip assembly 60 provides at least a portion of the battery assembly 24. In one example, the battery assembly 24 is provided entirely by a single cell strip assembly 60. In other examples, the battery assembly 24 includes a plurality of cell strip assemblies.

Figure 2B:
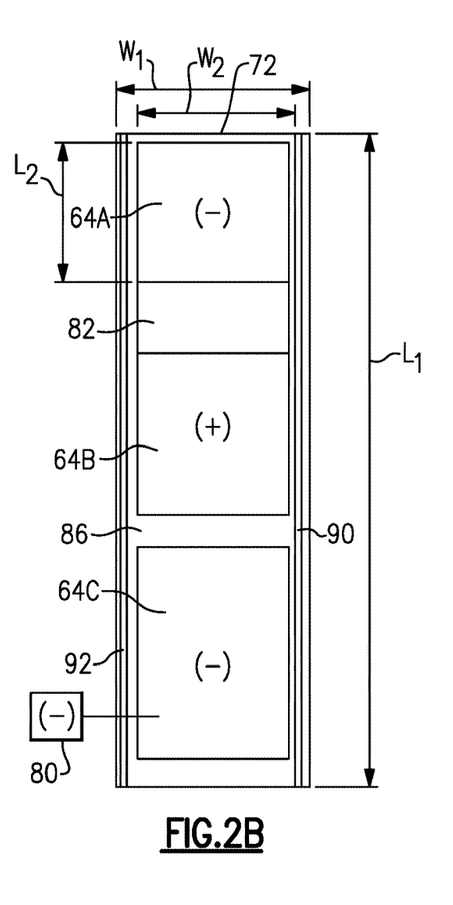
FIG. 2B illustrates a first carrier strip of the first example cell strip assembly.
Figure 2C:
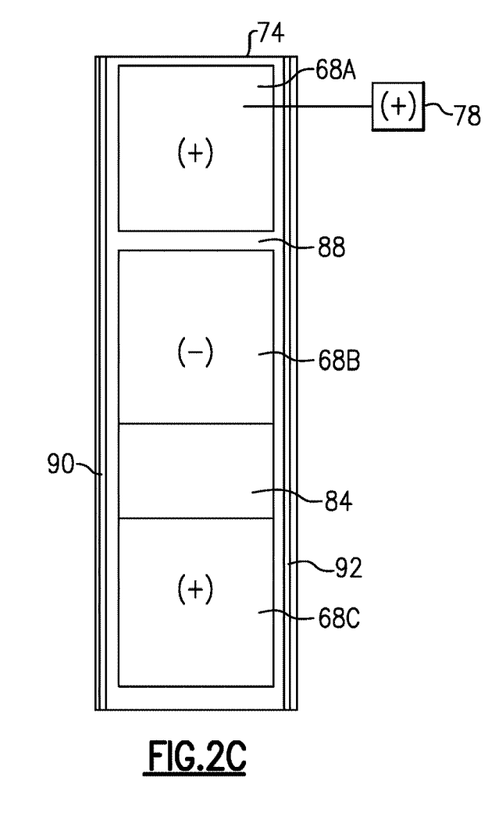
FIG. 2C illustrates a second carrier strip of the first example cell strip assembly.

With joint reference to FIGS. 2A-2C, the cell strip assembly 60 has a length $L_1$ and a width $W_1$. The cell strip assembly 60 includes a layer of electrolyte 62, a plurality of first electrodes 64A-64C arranged on a first side 66 of the layer of electrolyte 62, and a plurality of second electrodes 68A-68C arranged on a second side 70 of the layer of electrolyte 62.

In this example, the first electrodes 64A-64C are supported on a first carrier strip 72, and the second electrodes 68A-68C are supported on a second carrier strip 74. The first and second carrier strips 72, 74 have the same length $L_1$ and width $W_1$ as the cell strip assembly 60. The first and second electrodes 64A-64C, 68A-68C may each have a length $L_2$ and a width $W_2$. The width $W_2$ is substantially the same as the width $W_1$, and in this example is slightly less than the width $W_1$, such that the first and second electrodes 64A-64C, 68A-68C span substantially the entire width $W_1$ of the first and second carrier strips 72, 74, respectively. The lengths $L_2$ of the first and second electrodes 64A-64C, 68A-68C may be substantially shorter than the length $L_1$ of the first and second carrier strips 72, 74 so that a plurality of electrodes may be arranged along the length $L_1$ of the first and second carrier strips 72, 74.

The layer of electrolyte 62 in this example has a length substantially equal to the length $L_1$, and a width substantially equal to the width $W_2$. The layer of electrolyte 62 is a single, continuous layer of material extending along substantially the entire length of the battery assembly. This way, each of the battery cells within the cell strip assembly 60 uses a portion of a shared, common layer of electrolyte. Providing a single layer of electrolyte 62 increases the ease of manufacturing and assembling the cell strip assembly 60, since individual layers of electrolyte do not need to be separately affixed along the length $L_1$ of the cell strip assembly 60.

In this example, the layer of electrolyte 62 is provided by a layer of electrically insulative and ionically conductive material, such as a thermoplastic fluoropolymer material. One example of such material is polyvinylidene fluoride (PVDF), but it should be understood that this disclosure extends to other materials.

The first electrodes 64A-64C are arranged in an oppositely charged sequence along the length $L_1$ of the first carrier strip 72. For instance, with reference to FIG. 2B, beginning at the top, the electrode 64A is a negatively charged cathode, electrode 64B is a positively charged anode, and electrode 64C is a cathode. The second electrodes 68A-68C are also arranged in an oppositely charged sequence along the length $L_1$ of the second carrier strip 74, but the second electrodes 68A-68C are in the opposite order as the first electrodes 64A-64C. That is, with reference to FIG. 2C, beginning at the top, the electrode 68A is an anode, electrode 68B is a cathode, and electrode 68C is an anode.

The first and second carrier strips 72, 74 are made of relatively thin strips of material, in this example. The material of the first and second carrier strips 72, 74 is neither electrically nor ionically conductive. Thus, the first and second carrier strips 72, 74 do no conduct electricity or ions between the electrodes in this example. The first and second electrodes 64A-64C, 68A-68C are supported on the respective first and second carrier strips 72, 74, and are affixed to the first and second carrier strips 72, 74 using known techniques, such as printing or another type of deposition technique, for example. The first and second electrodes 64A-64C may be made of materials known for use in Lithium-ion batteries. In one example, the anodes are made of graphite or a metallic material such as aluminum or copper, which is then coated with graphite. Further, in this example, the cathodes are made of lithium or a metallic material such as aluminum or copper, which is then coated with lithium. These materials are examples only, and it should be understood that this disclosure extends to other types of materials.

After the first and second electrodes 64A-64C, 68A-68C are arranged on the first and second carrier strips 72, 74, the layer of electrolyte 62 is sandwiched between the first and second carrier strips 72, 74, as shown in FIG. 2A. Specifically, the first and second electrodes 64A-64C, 68A-68C directly contact the layer of electrolyte 62. The arrangement of FIG. 2A provides the cell strip assembly 60 with a plurality of battery cells 76A-76C along the length $L_1$ of the cell strip assembly. The battery cells 76A-76C are connected in series along the length $L_1$ of the cell strip assembly 60, in this example.

Each of the battery cells 76A-76C includes one of the first electrodes 64A-64C, one of the second electrodes 68A-68C, and a portion of the later of electrolyte 62. More specifically, each battery cell 76A-76C includes an anode from the group of first electrodes 64A-64C and a cathode from the group of second electrodes 68A-68C. Each anode-cathode pair is aligned along the length $L_1$ of the cell strip assembly 60, such that the battery cell 76A includes the cathode 64A and the anode 68A, and so on for the remaining battery cells 76B, 76C.

The battery cells 76A-76C function in the same way as known lithium-ion battery cells. Each of the battery cells 76A-76C produces substantially the same voltage. In one example, each of the battery cells 76A-76C produces about 3.5 Volts. Since the battery cells are connected in series, the cell strip assembly 60 provides a voltage equal to the sum of each of the battery cells 76A-76C.

Electrodes adjacent the ends of the cell strip assembly 60 are electrically coupled to terminals 78, 80. The terminals 78, 80 may couple the cell strip assembly 60 to a load, such as the motor 22, or another cell strip assembly. In this example, the terminal 78 is a positive terminal electrically coupled to the anode 68A, and the terminal 80 is a negative terminal electrically coupled to the cathode 64C.

While three battery cells 76A-76C and three pairs of electrodes 64A-64C, 68A-68C are shown in the figures, this disclosure extends to cell strip assemblies having additional battery cells, and in turn additional electrodes. In particular, it is contemplated that the cell strip assembly 60 may include on the order of about 96 battery cells. In such an example, a single cell strip assembly 60 may output enough power to drive the motor 22.

While this disclosure is not limited to any particular dimensions, the length $L_2$ of the electrodes 64A-64C, 68A-68C may be about 5.5 meters (about 18 feet). The width $W_2$ of the electrodes 64A-64C, 68A-68C may be about 0.1 meters (about 4 inches). Accordingly, in the above-mentioned example, a cell strip assembly 60 with 96 battery cells may be about 528 meters (about 1,732 feet) long. The cell strip assembly 60 is relatively thin, however, and thus it may be packaged according to one of the techniques discussed relative to FIGS. 5A-7, discussed below, for example.

As mentioned above, the battery cells 76A-76C are connected in series along the length $L_1$ of the cell strip assembly 60 in this example. In the illustrated arrangement, the cell 76A is electrically coupled to the cell 76B by way of a metal foil strip 82 mounted to the first strip 72. The metal foil strip 82 electrically couples the cathode 64A from cell 76A to the anode 64B of cell 76B. Cell 76B is electrically coupled to the cell 76C by way of a metal foil strip 84 mounted to the second strip 74. Specifically, the metal foil strip 84 electrically couples the cathode 68B to the anode 68C. The metal foil strips 82, 84 may be mounted to the adjacent electrodes as opposed to the first and second strips 72, 74. Further, while metal foil strips are shown in the drawings, these structures could be provided by metal depositions.

While the metal foil strips 82, 84 create electrical connections between certain adjacent opposite-charged electrodes, it should also be noted that certain electrodes are spaced-apart from one another along the length $L_1$ of the first and second strips 72, 74, such that the first and second strips 72, 74 electrically and ionically insulate certain electrodes from one another. For instance, in this example, the anode 64B is electrically and ionically insulated from the cathode 64C by a section 86 of the first strip 72. Further, the anode 68A is electrically and ionically insulated from the cathode 68B by a section 88 of the second strip 74. Again, while only three cells 76A-76C are illustrated in the figures, the arrangement of FIGS. 2A-2C could be extrapolated to any number of cells.

In one example of this disclosure, the first and second carrier strips 72, 74 are provided by separate pieces of material, which are then welded together by providing a weld seam at their edges and along their length. Reference numbers 90, 92 indicate example weld seam locations. In particular, after the electrodes 64A-64C, 68A-68C and metal foil strips 82, 84 are arranged relative to the first and second carrier strips 72, 74, the layer of electrolyte 62 is sandwiched between the first and second carrier strips 72, 74 and two weld seams are provided at the locations 90, 92. The weld seams extend along the entire length of the first and second carrier strips 72, 74, in this example. The weld seams seal the cell strip assembly 60 and protect it from the outside environment.

In another embodiment of this disclosure, the first and second strips 72, 74 may be provided by a single piece of material which is folded along the length $L_1$ to sandwich the layer of electrolyte 62. In this example, the location 90 is representative of a line about which the single piece of material is folded, and the location 92 is representative of a location at which a seam weld is provided. In both embodiments, the cell strip assembly 60 is sealed along its sides.

Figure 3A:
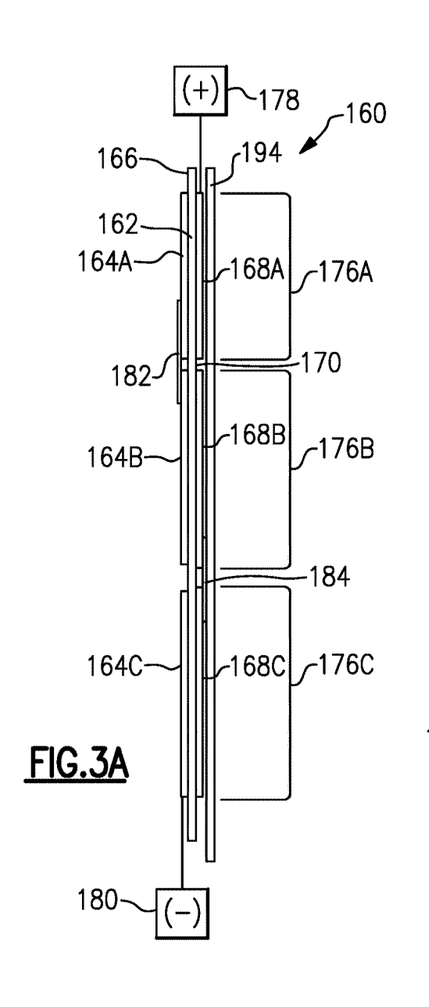
FIG. 3A illustrates a second example cell strip assembly from a side view.
Figure 3B:
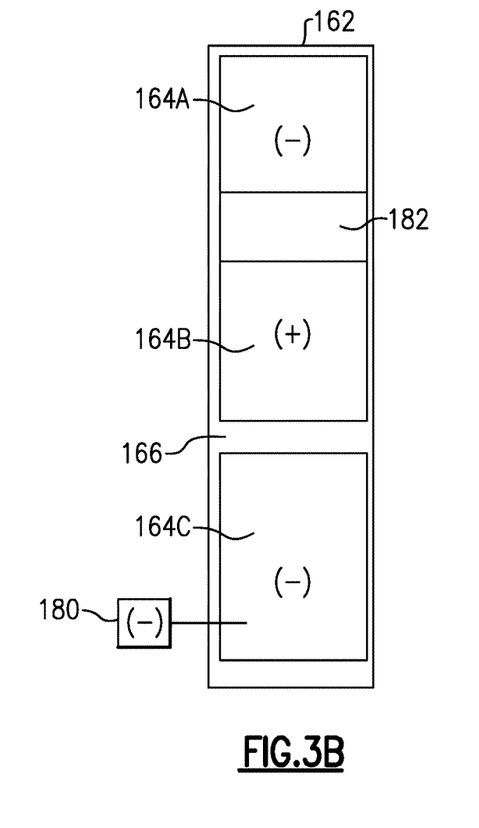
FIG. 3B illustrates a first side of a layer of electrolyte of the second example cell strip assembly.
Figure 3C:
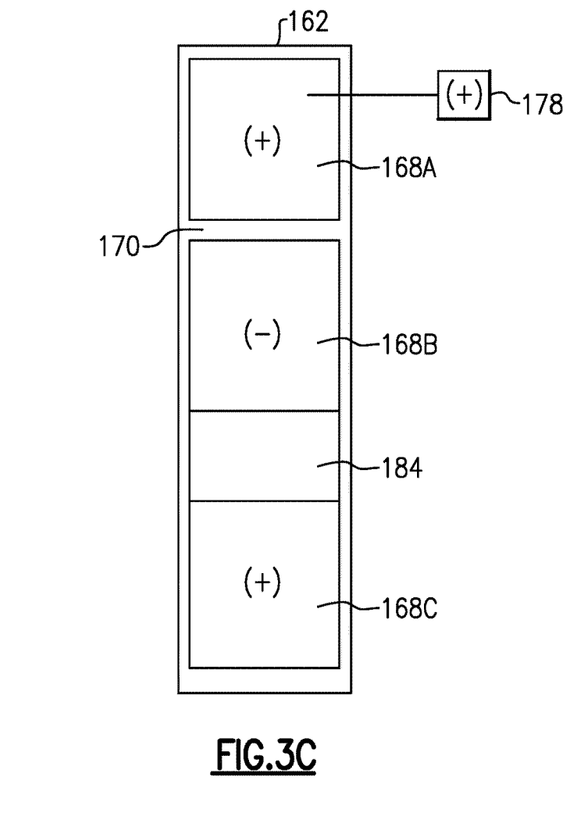
FIG. 3C illustrates a second side of a layer of electrolyte of the second example cell strip assembly.

In FIGS. 2A-2C, the electrodes 64A-64C, 68A-68C are mounted to first and second carrier strips 72, 74. In another embodiment of this disclosure, shown in FIGS. 3A-3C, the electrodes may be mounted directly to the electrolyte material without the need for carrier strips. FIGS. 3A-3C illustrate a cell strip assembly 160, which is similar to the cell strip assembly 60 in some respects. Like components between the two embodiments have common reference numerals, but with those in FIGS. 3A-3C preappended with a "1."

With joint reference to FIGS. 3A-3C, the cell strip assembly 160 includes a plurality of first electrodes 164A-164C mounted directly to a first side 166 of a layer of electrolyte 162, and a plurality of second electrodes 168A-168C mounted directly to a second side 170 of the layer of electrolyte 162. The electrodes 164A-164C, 168A-168C may be printed or deposited directly to the layer of electrolyte 162, as discussed above.

The electrodes 164A-164C, 168A-168C essentially sandwich the layer of electrolyte 162 in the same way as in FIGS. 2A-2C to provide a number of battery cells 176A-176C. In particular, the cathode 164A of cell 176A is electrically coupled to the anode 164B of cell 176B by a metal foil 182, and the cathode 168B of cell 176B is electrically coupled to the anode 168C of cell 176C by a metal foil 184. In order to prevent contact between the layer of electrolyte 162 and the metal foil strips 182, 184, the metal foil strips 182, 184 are mounted to the electrodes on surfaces opposite the layer of electrolyte 162.

As will be appreciated from the below, the cell strip assembly 160 may be rolled around a spool for efficient packaging. As such, in this example the cell strip assembly 160 includes a second layer of electrolyte 194, which covers and electrically insulates the second electrodes 168A-168C and the metal foil strip 184 from a side opposite the layer of electrolyte 162. The second layer of electrolyte 194 has a length and width substantially the same as the length and width of the layer of electrolyte 162. In this way, as the cell strip assembly 160 is rolled, unwanted contact between adjacent layers of the roll is prevented.

Figure 4A:
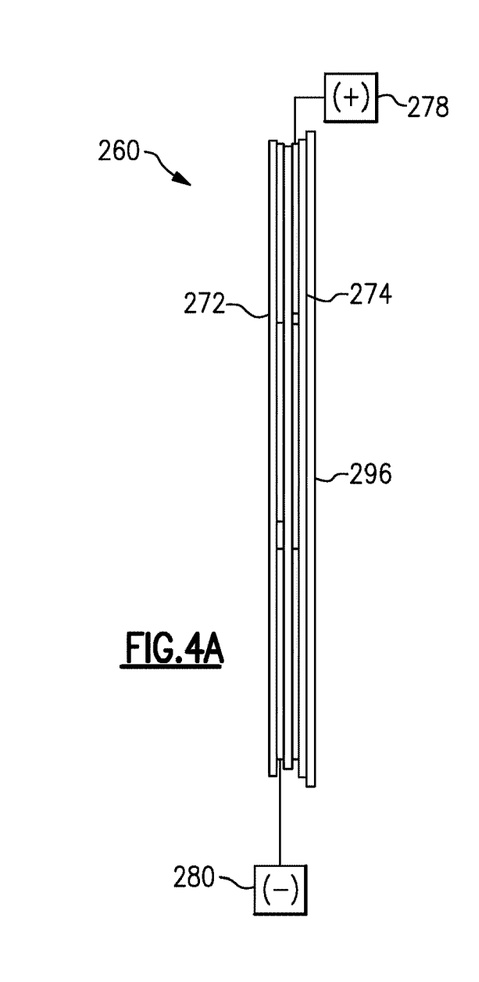
FIG. 4A illustrates a third example cell strip assembly from a side view.
Figure 4B:
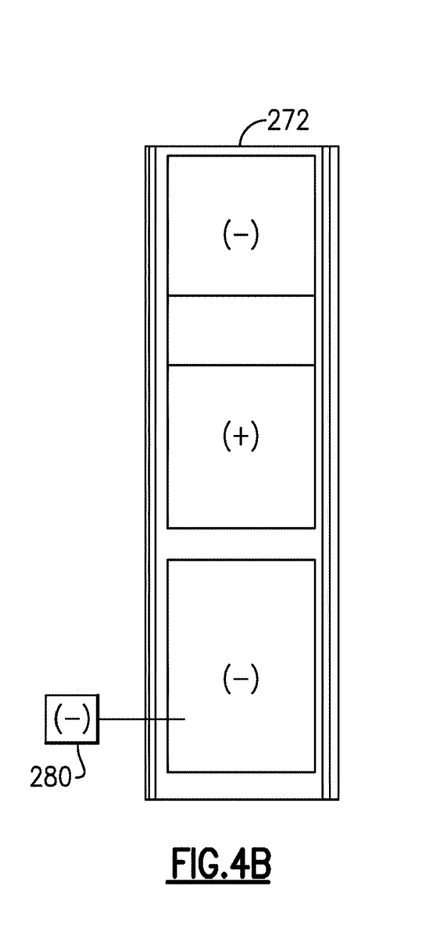
FIG. 4B illustrates a first carrier strip of the third example cell strip assembly.
Figure 4C:
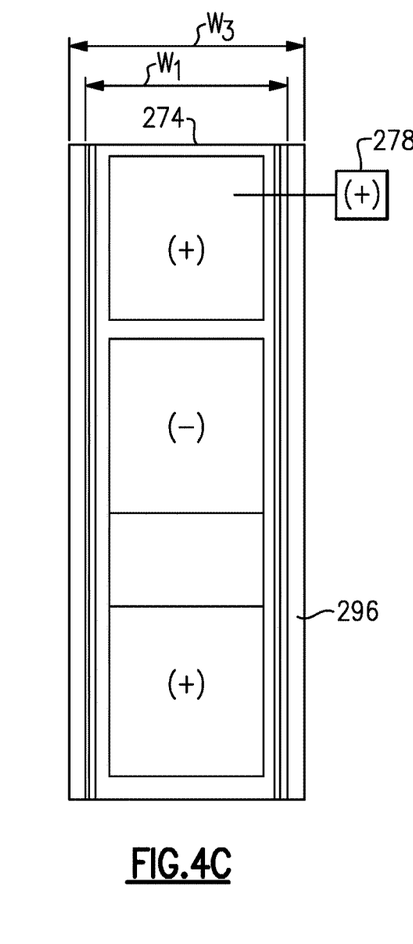
FIG. 4C illustrates a second carrier strip of the third example cell strip assembly.

FIGS. 4A-4C illustrate another cell strip assembly 260, which is substantially similar to the cell strip assembly 60, with like components having reference numerals preappended with a "2." FIGS. 4A-4C illustrate a metal foil layer 296, which may be affixed to one of the first and second carrier strips 272, 274. In this example, the metal foil layer 296 is affixed to a surface of the second carrier strip 274 opposite the side facing the electrodes and the layer of electrolyte. The metal foil layer 296 is configured to conduct heat away from the cell strip assembly 260, and in particular is configured to conduct heat away from the cells of the cell strip assembly. As discussed below, the cell strip assembly 260 may be arranged in a vehicle adjacent a thermal exchange plate, and the metal foil layer 296 may facilitate heat transfer between the cell strip assembly 260 and a thermal exchange plate. To this end, the metal foil layer 296 may have a width $W_3$ greater than the width $W_2$ of the first and second carrier strips 272, 274. In this way, the metal foil layer 296 may project beyond the first and second carrier strips 272, 274 in the direction of the width to facilitate contact between the metal foil layer 296 and a thermal exchange plate.

Figure 5A:
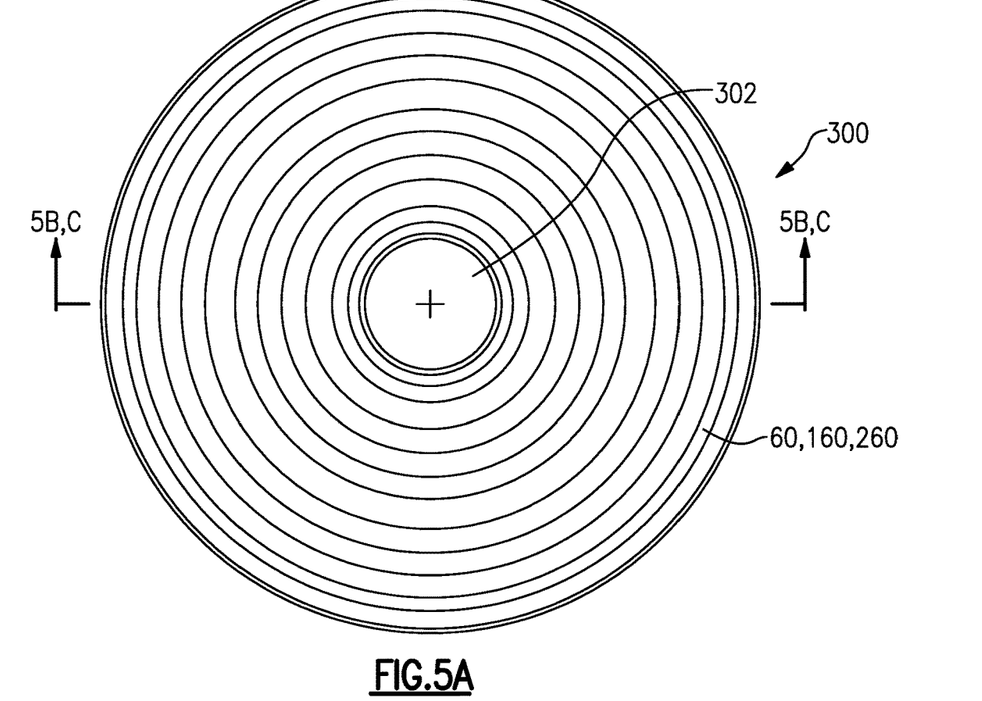
FIG. 5A illustrates a first example spool from a top view.
Figure 5B:
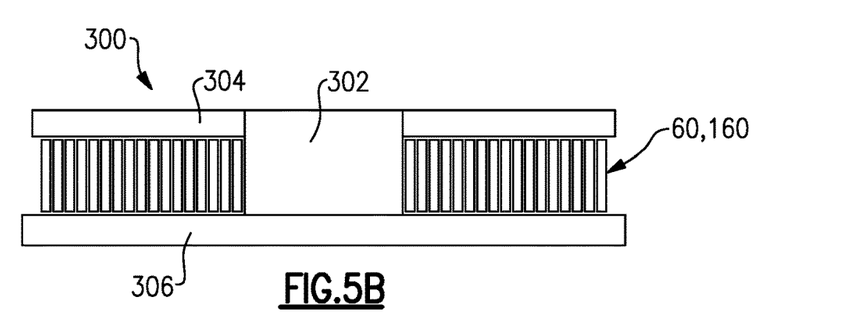
FIG. 5B is a cross-section taken along line 5B,C-5B,C in FIG. 5A, and in particular illustrates the arrangement of a cell strip assembly relative to the first example spool.
Figure 5C:
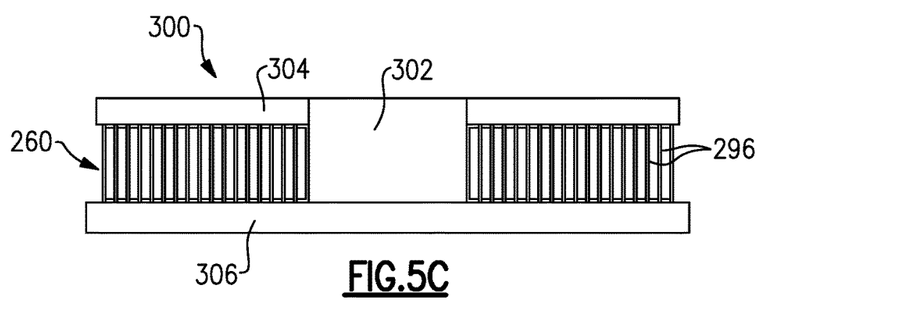
FIG. 5C is a cross-section taken along line 5B,C-5B,C in FIG. 5A, and in particular illustrates the arrangement of a cell strip assembly including a metal foil relative to the first spool.

As mentioned above, the various disclosed cell strip assemblies 60, 160, 260 may be wrapped about a spool to allow for efficient packaging, although this disclosure extends to assemblies that are not wrapped around a spool. FIG. 5A illustrates a first example spool 300. In this example, the spool 300 is substantially circular in cross-section and includes a central portion 302, which is shaped like a cylinder in this example. As shown in FIGS. 5B and 5C, first and second flanges 304, 306 project radially from ends of the central portion 302.

After the cell strip assemblies 60, 160, 260 are sandwiched together (as shown in FIGS. 2A, 3A, and 4A), the cell strip assemblies 60, 160, 260 are rolled around the central portion 302 and layered upon one another a number of times. The result is a roll of layers of the cell strip assemblies 60, 160, 260.

During use, the cell strip assemblies 60, 160, 260 may generate significant heat. As such, one or more of the flanges 304, 306 may include thermal exchange plates, such as cold plates. The thermal exchange plates may be any known type of thermal exchange plate configured to absorb heat from a heat source, such as the cell strip assemblies 60, 160. As shown in FIG. 5C, the cell strip assembly 260 includes the metal foil layer 296, which is in direct contact with both of the flanges 304, 306, and thus increases heat transfer between the flanges 304, 306 and the cell strip assembly 260.

Figure 6A:
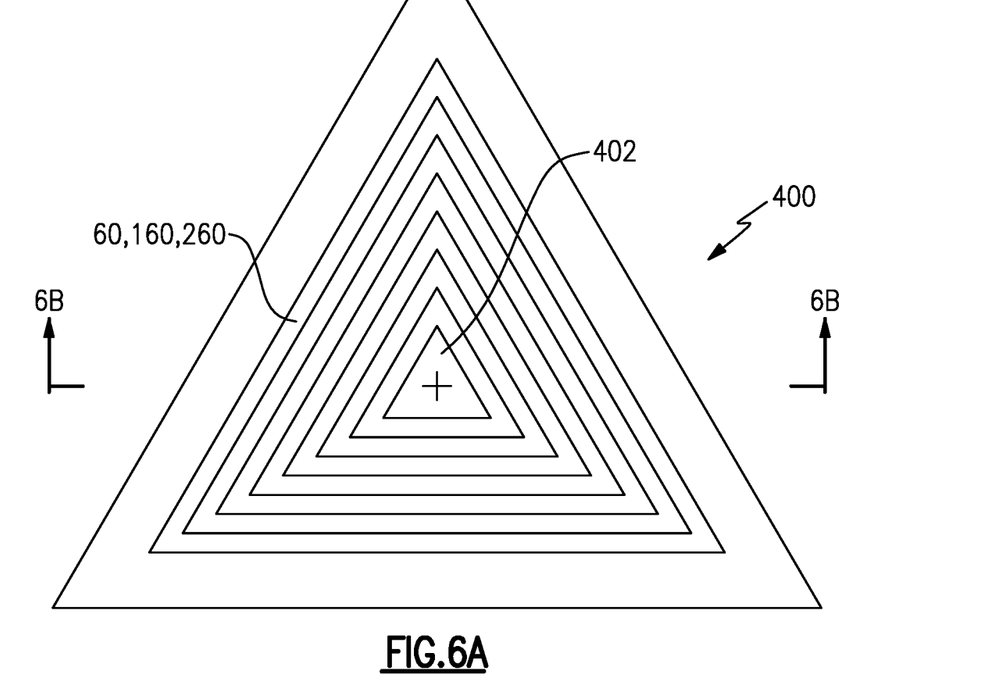
FIG. 6A illustrates a second example spool from a top view.
Figure 6B:
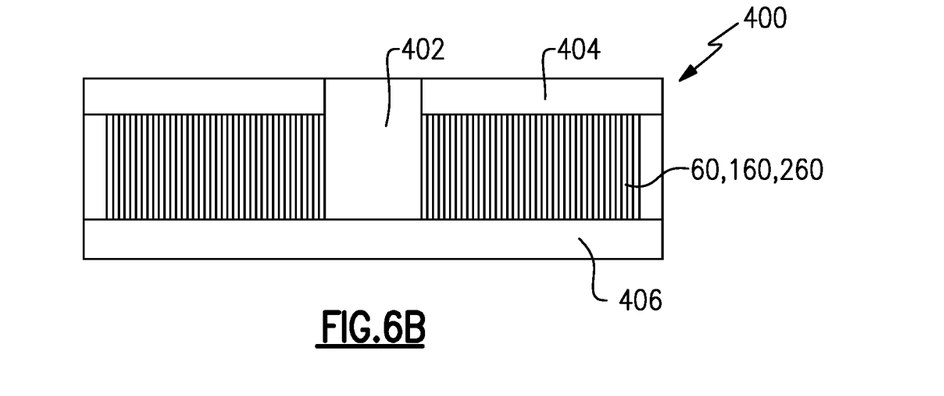
FIG. 6B is a cross-section taken along line 6B-6B in FIG. 6A, and in particular illustrates the arrangement of a cell strip assembly relative to the second example spool.

FIGS. 6A and 6B illustrate another example spool 400 which is substantially triangular in cross-section and which includes a central portion 402, which is also shaped like a triangle in cross-section. First and second flanges 404, 406 project radially from opposite ends of the central portion 402, and, as above, one or more of the first and second flanges 404, 406 may include a thermal exchange plate.

Figure 7:
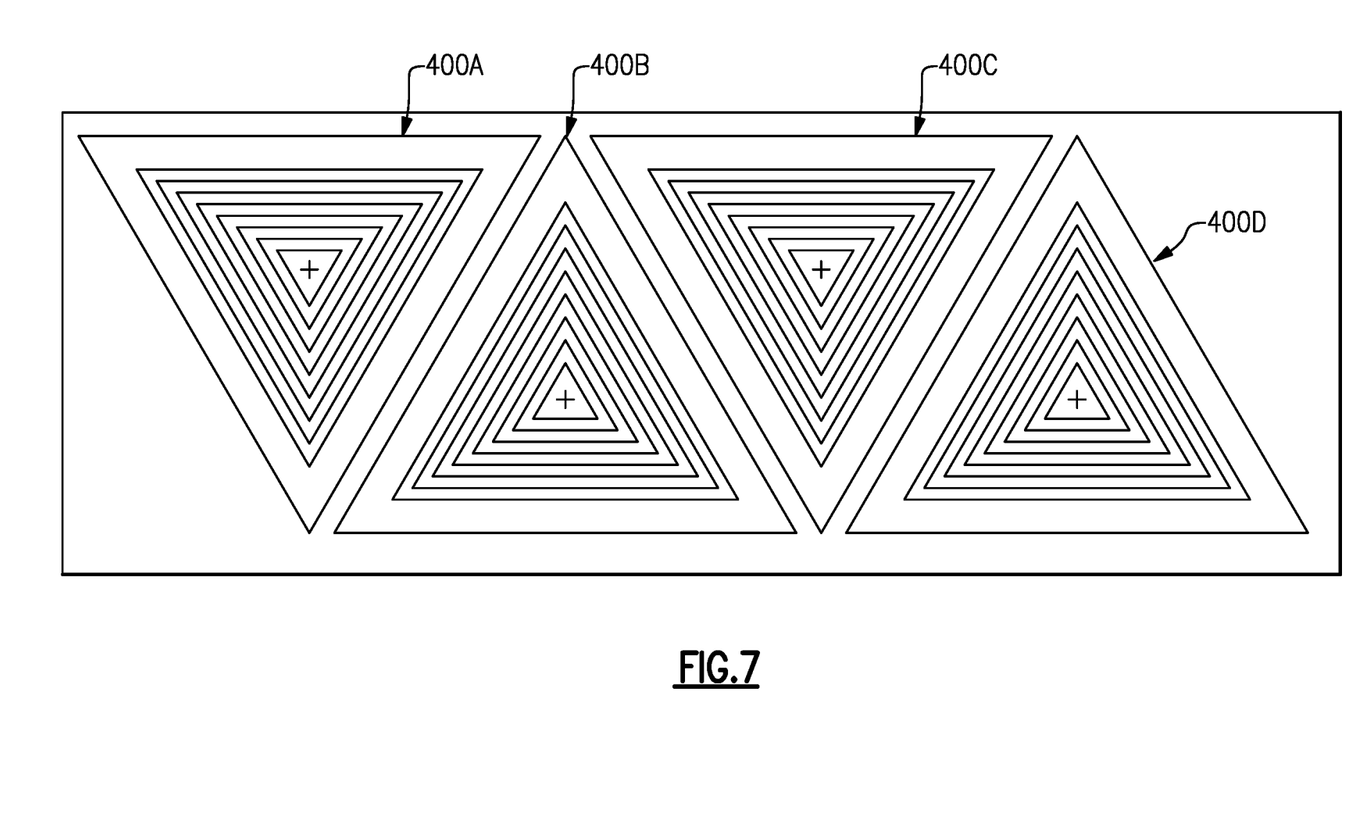
FIG. 7 illustrates a plurality of the second example spools arranged relative to one another.

As noted above, a battery assembly 24 may include one or more cell strip assemblies 60, 160, 260. The spool 400 may offer additional packaging options when more than one cell strip assembly 60, 160, 260 is needed. For example, as illustrated in FIG. 7, a plurality of triangular-shaped spools 400A, 400B, 400C, 400D may be arranged relative to one another in a way that minimizes occupied space. In the example of FIG. 7, adjacent spools 400A, 400B, 400C, 400D are inverted, which allows for an additional spool to fill the space between spools that have a common orientation (i.e., the spool 400C is inverted relative to spools 400B and 400D, and the spool 400C fits in the space between spools 400B and 400D). While circular and triangular spools have been shown in the figures, this disclosure extends to other arrangements.

While in the embodiments of FIGS. 2A-2C, 3A-3C, and 4A-4C the cell strip assemblies 60, 160, 260 include battery cells arranged in series, this disclosure extends to cell strip assemblies including battery cells arranged in parallel or in some combination of series and parallel. An example cell strip assembly 560 including at least some battery cells connected in parallel is shown across FIGS. 8A-8C. The cell strip assembly 560 is similar to the cell strip assembly 60, with like components having reference numerals preappended with a "5."

Figure 8A:
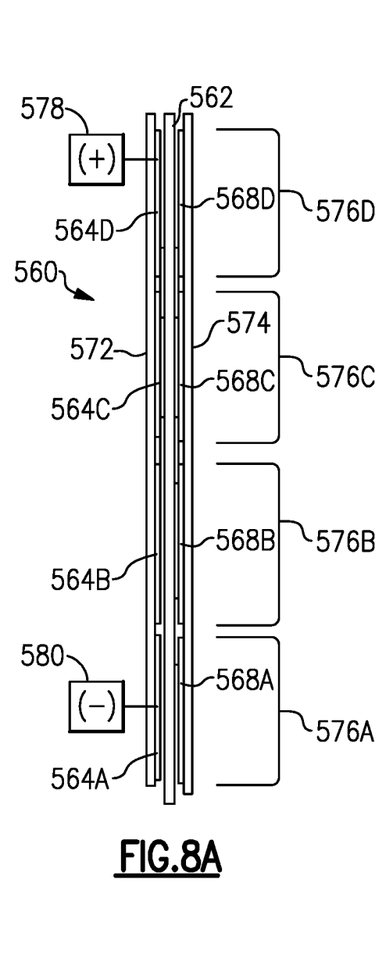
FIG. 8A illustrates a fourth example cell strip assembly from a side view.

With reference to FIG. 8A, the cell strip assembly 560 includes first and second carrier strips 572, 574 on opposite sides of a layer of electrolyte 562. In this example, four electrodes 564A-564D are mounted to the first carrier strip 572, and four electrodes 568A-568D are mounted to the second carrier strip 574. The cell strip assembly 560 thus includes four cells 576A-576D.

Figure 8B:
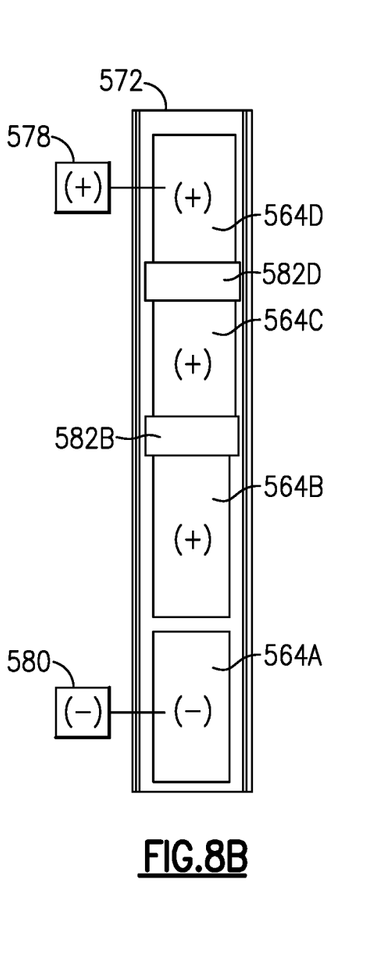
FIG. 8B illustrates a first carrier strip of the fourth example cell strip assembly.
Figure 8C:
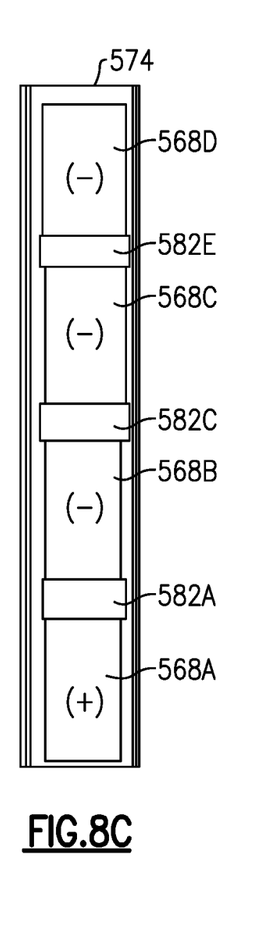
FIG. 8C illustrates a second carrier strip of the fourth example cell strip assembly.

With joint reference to FIGS. 8A-8C, an example electrical connection in which at least some cells are connected in parallel will now be described. Beginning at the bottom of the figures, the cathode 564A of the cell 576A is electrically coupled to a negative terminal 580. The cell 576A is electrically connected to the cell 576B in series by way of a metal foil 582A between the anode 568A of cell 576A and the cathode 568B of the cell 576B. Cell 576B is then connected in parallel with cells 576C and 576D. Specifically, the anodes 564B and 564C are connected by a metal foil 582B, and the cathodes 568B and 568C are connected by a metal foil 582C. Further, the anodes 564C and 564D are connected by a metal foil 582D, and the cathodes 568C and 568D are connected by a metal foil 582E. Finally, the anode 568D is electrically coupled to a positive terminal 578. As in the earlier embodiments, the cell strip assembly 560 is not limited to any number of battery cells, and the illustrated arrangement can be extrapolated to include any number of battery cells. Further, this disclosure is not limited to the details of the way in which the cells are connected together in FIGS. 8A-8C, and extends to other arrangements.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:
1. A battery assembly, comprising:
a layer of electrolyte provided by a single, continuous layer of material;
a plurality of first electrodes arranged on a first side of the layer of electrolyte;
a plurality of second electrodes arranged on a second side of the layer of electrolyte;
a plurality of battery cells each including a portion of the layer of electrolyte, one of the first electrodes, and one of the second electrodes;
wherein the first electrodes include a plurality of anodes and a plurality of cathodes,
wherein the second electrodes include a plurality of anodes and a plurality of cathodes, and
wherein each of the cells includes an anode arranged on one of the first and second sides and a cathode arranged on the other of the first and second sides.

2. The battery assembly as recited in claim 1, wherein the layer of electrolyte is provided by a layer of electrically insulative and ionically conductive material.

3. The battery assembly as recited in claim 1, wherein the first and second electrodes are mounted to the layer of electrolyte.

4. The battery assembly as recited in claim 3, wherein:
adjacent oppositely-charged pairs of the first electrodes are electrically coupled together by metal foil mounted to the first electrodes, and
adjacent oppositely-charged pairs of the second electrodes are electrically coupled together by metal foil mounted to the second electrodes.

5. The battery assembly as recited in claim 4, further comprising:
a second layer of electrolyte covering the second electrodes and the metal foil mounted to the second electrodes.

6. The battery assembly as recited in claim 1, further comprising:
a first carrier strip, the first electrodes supported on the first carrier strip; and
a second carrier strip, the second electrodes supported on the second carrier strip.

7. The battery assembly as recited in claim 6, wherein the first and second electrodes have widths substantially equal to widths of the first and second carrier strips and a width of the layer of electrolyte.

8. The battery assembly as recited in claim 6, wherein:
adjacent oppositely-charged pairs of the first electrodes are electrically coupled together by metal foil mounted to the first carrier strip, and
adjacent oppositely-charged pairs of the second electrodes are electrically coupled together by metal foil mounted to the second carrier strip.

9. The battery assembly as recited in claim 6, wherein the first and second carrier strips are provided by separate pieces of material.

10. The battery assembly as recited in claim 6, wherein the first and second carrier strips are provided by a single piece of material that is folded along its length.

11. The battery assembly as recited in claim 6, wherein the first and second carrier strips are made of a material that is neither electrically nor ionically conductive.

12. The battery assembly as recited in claim 1, further comprising:
a metal foil layer configured to conduct heat away from the battery cells.

13. The battery assembly as recited in claim 12, further comprising:
a spool, wherein the battery assembly is wrapped around the spool.

14. The battery assembly as recited in claim 13, wherein the spool is one of circular and triangular in cross-section.

15. The battery assembly as recited in claim 13, further comprising:
a thermal exchange plate adjacent the spool, the thermal exchange plate coupled to the metal foil layer.

16. A method, comprising:
arranging a plurality of first electrodes on a first side of a layer of electrolyte;
arranging a plurality of second electrodes on a second side of the layer of electrolyte; and
sandwiching the layer of electrolyte between the first and second electrodes to provide a plurality of battery cells along a length of the layer of electrolyte;
wherein the first electrodes include a plurality of anodes and a plurality of cathodes,
wherein the second electrodes include a plurality of anodes and a plurality of cathodes, and
wherein each of the cells includes an anode arranged on one of the first and second sides and a cathode arranged on the other of the first and second sides.

17. The method as recited in claim 16, further comprising rolling the sandwiched arrangement about a spool.

18. The method as recited in claim 16, further comprising cooling the sandwiched arrangement using a thermal exchange plate.

19. The method as recited in claim 16, further comprising arranging the battery cells either in series or in parallel.

* * * * *